United States Patent [19]

Morisaki

[11] 4,005,952
[45] Feb. 1, 1977

[54] GEAR PUMP

[75] Inventor: Nobukazu Morisaki, Aichi, Japan

[73] Assignee: Daido Metal Company, Ltd., Nagoya, Japan

[22] Filed: Mar. 18, 1975

[21] Appl. No.: 559,648

[30] Foreign Application Priority Data

Nov. 8, 1974    Japan ............................ 49-128636

[52] U.S. Cl. ............................................... 418/131
[51] Int. Cl.² ........................................ F04C 15/00
[58] Field of Search ............................ 418/131, 132

[56]    References Cited
UNITED STATES PATENTS 3,173,374   3/1965   Beimfohr ............................. 418/131

FOREIGN PATENTS OR APPLICATIONS

| 163,310 | 6/1954 | Australia ................ 418/131 |
| 1,142,537 | 9/1957 | France ................... 418/131 |
| 1,553,233 | 5/1970 | Germany ................. 418/131 |
| 193,943 | 1/1965 | Sweden .................. 418/131 |
| 1,067,552 | 5/1967 | United Kingdom ......... 418/131 |

Primary Examiner—C. J. Husar
Assistant Examiner—Leonard Smith
Attorney, Agent, or Firm—Karl W. Flocks

[57]    ABSTRACT

A low-noise, high-pressure, high-performance gear pump, including pressure balancing means comprising pairs of surrounding seal members positioned between side walls of a pump casing and bearing means for bearing a driving and driven shafts associated with respective intermeshing gears to form pressure chambers between each pair of said pairs of surrounding seal members, and passage means provided through said bearing means for leading oil under intermediate pressure into said pressure chamber; and oil recovering means suitably associated with said pressure balancing means to enable the smooth recovery of oil used for lubrication.

3 Claims, 14 Drawing Figures

GEAR PUMP

The present invention relates to a gear pump, and more particularly to a gear pump provided with novel pressure balancing means which makes it possible to separate completely oil under high pressure and oil under low pressure from each other, thereby to provide a low-noise, high-pressure, high-performance gear pump.

DESCRIPTION OF THE PRIOR ART

In gear pumps with a conventional pressure balancing mechanism, there was adopted an arrangement that a pressure on the discharge side of the gear pump presses bearings or side plates against the suction side of the gear pump to form clearances between the casing and the outer peripheries of the bearings through which a high pressure oil is introduced into the gaps between the side walls of the casing and the surfaces of the bearings opposite to the side walls of the casing, and thus introduced oil establishes a pressure balance on the bearings, thereby to maintain constant the gaps between the side walls of the casing and the surfaces of the bearings opposite to the side walls of the casing and the gaps between the side surfaces of the gears and the surfaces of the bearings opposite to the side surfaces of the gears. Such prior art arrangement accompanies on inevitable disadvantage that since a portion of the high pressure oil flows to the low pressure zone, i.e., the suction side of the gear pump, the performance of the gear pump is degraded. The degradation of gear pump performance becomes more conspicuous with the increase in discharge pressure.

The present invention provides a gear pump which eliminates the above disadvantage of the prior art. According to the present invention, there is provided a low-noise, high-pressure, high-performance gear pump which is arranged to enable the complete separation of the high pressure oil and the low pressure oil from each other so as not to be mixed with each other, and is arranged to lead pressure oil used for performing a pressure balance, through passage means provided in the bearing means to the surfaces of the bearing means opposite to the side wall means, thereby to maintain constant clearances between the bearing means and the side wall means and between the bearing means and the gears. The pressure balancing means according to the present invention is characterized in that it comprises pairs of surrounding seal members positioned between the side surfaces of the bearing means, i.e., the outer end surfaces of the bearing means and the side wall means so as to surround respectively the driving shaft and the driven shaft, and passage means provided in the bearing means for leading oil under pressure into chambers formed between each pair of said pairs of surrounding seal members. The oil led into the pressure chambers between each pair of said pairs of surrounding seal members plays a role of maintaining constant the axial gaps between the bearing means and the gears and between the bearing means and the side wall means. And this oil is prevented from flowing to the suction side which is lower in pressure than the chambers formed between each pair of the pairs of surrounding seal members.

The present invention also solves the problem of how to associate the above described novel pressure balancing means with the lubricating oil recovering means of the gear pump. Needless to say, the lubricating oil to make smooth the sliding movement of the gear shafts in the bearing means is essential to all types of gear pumps, and in any gear pump design there must naturally be provided a means for recovering the lubricating oil. Since the present invention involves a novel pressure balancing means as described above, the question of what the most effective and advantageous lubricating oil recovering means is should be settled in conjunction with the use of this novel pressure balancing means. In the present invention, there is employed lubricating oil recovering means including a first passage means for recovering the lubricating oil which extends through a driven shaft, so that the lubricating oil can be smoothly recovered to the suction side without being mixed with the high pressure oil.

As has been described above, the present invention provides a gear pump comprising a novel pressure balancing means and novel lubricating oil recovering means associated with said pressure balancing means in an advantageous manner.

Accordingly, an object of the present invention is the provide a low-noise, high-pressure, high-performance gear pump.

Another object of the present invention is to provide a gear pump having a pressure balancing means adapted to separate the high pressure oil and the low pressure oil from each other completely so that a favorable balance of the pressures is maintained.

A still further object of the present invention is to provide a gear pump having lubricating oil recovering means used in the state associated with said pressure balancing means and adapted to perform a superior lubricating oil recovering operation.

Other objects of the present invention will become sufficiently from some embodiments of the present invention to be described hereinafter with reference to the accompanying drawings.

Figure 5:
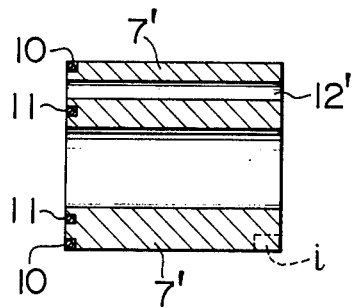
FIG. 5 is a sectional view taken along the line V—V of FIG. 4.
Figure 12:
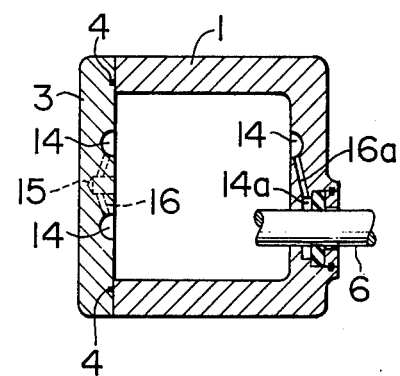
Figure 13:
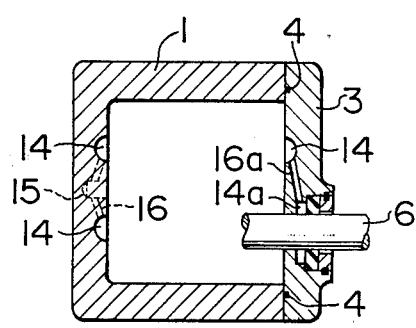
Figure 14:
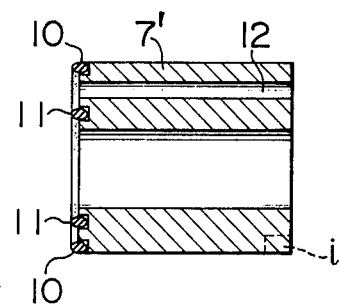

FIGS. 12 and 13 are side views showing modifications of the casing and casing cover unit to be used in the gear pump in accordance with the present invention, FIG. 12 illustrating a casing and casing cover unit having a casing provided only on the left side thereof with a casing cover, and FIG. 13 showing a casing and casing cover unit having a casing provided only on the right side thereof with a casing cover; and FIG. 14 is a view illustrating the operation of the pump portion shown in FIG. 5, in which there is illustrated how a bearing member 7' is pressed to the right by the oil introduced into a chamber O through a passage 12 (the formation of the chamber O being explained).

DETAILED DESCRIPTION OF THE PREFERRED EMBODIMENTS

Figure 1:
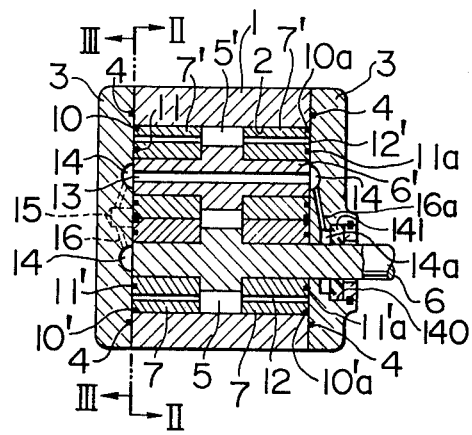
FIG. 1 is a sectional side view showing a portion of a gear pump which is an embodiment of the present invention and in which pressure balancing means are arranged in the bearings on both sides of the gears.
Figure 2:
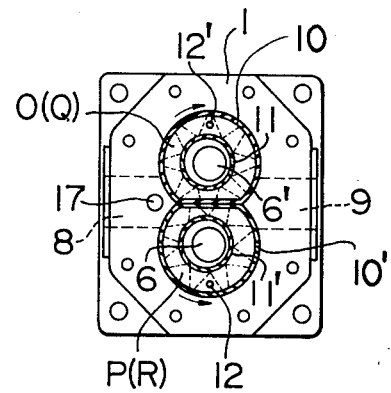
FIG. 2 is a front view taken along the line II—II of FIG. 1.
Figure 3:
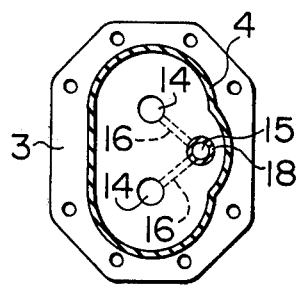
FIG. 3 is a front view of a cover taken along the line III—III of FIG. 1.
Figure 4:
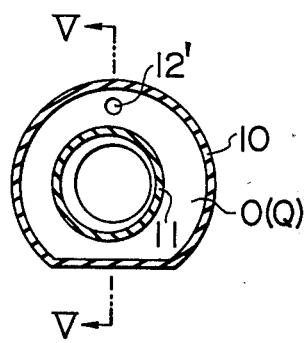
FIG. 4 is an enlarged view of seals and a bearing member.

Hereunder, explanations will be given to some embodiments of the present invention with reference to the drawings. FIG. 1 is a sectional side view of a portion of a gear pump which is one embodiment of the present invention. FIG. 2 is a front view taken along the line II—II of FIG. 1 with a cover 3 being removed from the pump. And FIG. 3 is a front view of the cover 3 taken along the line III—III of FIG. 1. A casing 1 of the gear pump has a hollow portion 2 in the shape of an elongate hole with an elliptic section. The hollow portion 2 is such that a pair of intermeshing gears 5 and 5' can be received therein. The covers 3 forming portions of the casing 1 are securely fixed to both ends of the casing 1 through seals 4 in a liquid tight manner. A shaft 6 of a gear 5 and a shaft 6' of a gear 5' respectively are rotatably supported by bearing members 7 and 7'. The shaft 6 is a driving shaft and the shaft 6' is a driven shaft. The driving shaft 6 extending outside the cover 3 of the casing 1 is driven to rotate the intermeshing gears 5 and 5'. When the intermeshing gears 5 and 5' are rotated in the directions of the arrows in FIG. 2, the oil is down from a suction port 8 in the casing 1 and is discharged into a discharge port 9. Eight flexible seals 10, 11, 10', 11', 10a, 11a, 10'a, 11'a are arranged between the covers 3 and the end surfaces of the bearing members 7 and 7' in the axial direction of the bearing members 7 and 7' and adjacent to the covers 3. FIG. 4 is an enlarged view of seals 10 and 11 showing the shapes of the seals 10 and 11. By referring to FIGS. 1, 2 and 4, it will be understood that the seals 10 through 11'a form four chambers between the covers 3 and the end surfaces of the bearing members 7 and 7' in the axial direction of the bearing members 7 and 7' and adjacent to the covers 3. A chamber O between a pair of the seals 10 and 11, a chamber P between a pair of the seals 10' and 11', a chamber Q between a pair of the seals 10a and 11a, and a chamber R between a pair of the seals 10'a and 11'a are formed in a liquid tight manner, each of said pairs of seals surrounding each of said chambers. Of the above seals, the seals 11, 11', 11a and 11'a are located at positions slightly displaced toward the suction port 8 with respect to the gear shafts, as illustrated in FIG. 2. In FIG. 1, the seals are provided on the bearing members. However, needless to say, the seals may be provided on the covers 3 depending upon such design factors as the size of the pump and so on. These seals, which are arranged on the end surfaces of the bearing members in the axial direction of the bearing members and adjacent to the covers, play a role of separating the high pressure side and the low pressure side from each other completely.

Figure 6:
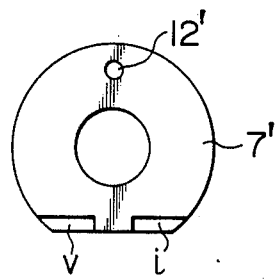
FIG. 6 is a rear view showing the bearing member of FIG. 4 looked in the direction toward the rear surface thereof.

FIG. 5 is a sectional view taken along the line V—V of FIG. 4. As shown in FIGS. 1, 2, 4 and 5, the bearing members 7 and 7' have through oil passages 12 and 12' extending therein. A through oil passage 13 extends in the middle of the driven shaft 6' in the axial direction of the driven shaft 6'. FIG. 6 is a rear view illustrating the bearing member 7' of FIG. 4 looked in the direction toward the rear surface thereof. As shown in the figure, the bearing members 7 and 7' are provided with notched portions $i$ and $v$ respectively in communication with the suction port 8 and the discharge port 9. The through oil passages 12 and 12' extend in the bearing members intermediate between the pump suction ports $8i$ and the pump discharge ports $9v$ in the axial direction of the bearing members, as can be seen from FIGS. 1, 2, 4 and 5. The through oil passages 12 and 12' communicate with the chambers O, P, Q and R. FIGS. 1 and 3 show that three oil holes 14 and one oil hole 14a are disposed in the covers 3 at positions where the driving shaft 6 and the driven shaft 6' are opposite to the covers 3. The oil hole 14a is defined by the outer peripheral surface of the driving shaft 6 and the inner end surface of a seal member 141 which is located in a stepped bore 140 bored in the cover 3 in abutting engagement with the shoulder of the stepped hole 140. One of the covers 3 is provided near the suction port with a communicating pipe 15 which is in communication with the oil holes 14 through oil discharge passages 16, as shown in FIG. 3. The other of the cover 3 has an oil discharge passage 16a communicating between the oil hole 14a and the oil hole 14 (see FIG. 1). The communicating pipe 15 is in communication with a recovery hole 17 provided in the outer end of the casing 1 at a position near the suction port 8. The recovery hole 17 communicates with the suction port 8.

Figure 7:
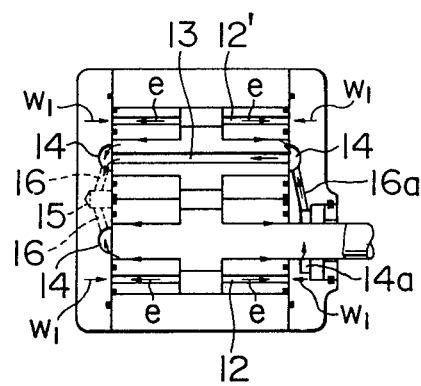
FIG. 7 is an explanatory view illustrating the flows of the oil.
Figure 8:
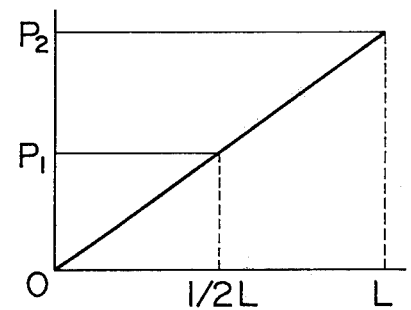
FIG. 8 is a diagram showing the increase of the lubricating oil pressure which takes place when the lubricating oil moves from the suction port through the interior of the casing and through the spaces between the adjacent teeth of the gears to the discharge port.

Hereunder an explanation will be made on the operation of the gear pump having the construction described above. When the driving shaft 6 is actuated the intermeshing gears 5 and 5' are rotated in the directions of the arrows in FIG. 2 to begin a pump operation, the liquid drawn from the suction port 8 into the spaces between the adjacent teeth of the gears 5 and 5' is transported along the inner periphery of the casing 1 to be forcedly discharged through the discharge port 9 by the movement of the intermeshing gears. With the rotation of the gears 5 and 5', the oil is confined in the spaces between the adjacent teeth of the gears, compressed increasingly, and discharged under a high pressure from the discharge port 9. FIG. 8 is a diagram illustrating the relationship between the oil pressure P and the distance L from the suction port $8a$ to the discharge port $9v$. The distance L is measured along the gear teeth and the inner periphery of the casing. It can be seen that the oil pressure increases nearly rectilinearly from O to $P_1$ to $P_2$ as the fluid moves from the suction port $8i$ to the discharge port $9v$. The through oil passages 12 and 12' are arranged at positions where an intermediate pressure is presented, said positions being indicated in FIG. 8 by ½L. For this reason, the liquid under an intermediate pressure $P_1$ is introduced into the previously described chambers O, P, Q and R which are formed between each pair of the surrounding pairs of seals. The oil thus introduced plays a role of maintaining the oil films on the thrust surfaces of the gears and the thrust surfaces of the bearing members at a uniform thickness, so that wear of the bearings is prevented and the amount of oil leaked is reduced. The seals 11, 11', 11a, and 11'a prevent the high pressure oil from being leaked through the gaps between the covers 3 and the bearing members 7 and 7' and the gaps between the adjacent bearing members 7 and 7' (note that the seals 10 and 10' are partly flattened and are in tight contact with each other at the flattened portions thereof as shown in FIG. 2). The low pressure oil used for lubricating the bearings is recovered to the suction port 8 through the oil discharge passages 16 and 16a, the through oil passage 13, the communicating passage 15, and the recovery hole 17. Thanks to a seal 18 associated with the communicating passage 15, the low pressure oil is recovered to the suction port 8 satisfactorily without being mixed with the high pressure oil. In FIG. 7, the arrows indicate the flows of the oils described above. First, the oil under the intermediate pressure $P_1$, enters the through passages 12 and 12' in the bearing members 7 and 7' (see the arrows e) to be confined in the previously described chambers O, P, Q and R on the surfaces of the covers 3. The intermediate pressure oil in said chambers exerts reacting forces to the bearing members. Each of these reacting forces (indicated by the arrows $W_1$) is the oil pressure (let this pressure be P) multiplied by the area of each of the chambers O, P, Q and R (let this area be $a$). On the other hand, there is a pressure (let this pressure be $W_2$) which is produced by the movement of the gears 5 and 5' and acts on the bearings to increase the gaps between the bearings and the gears. This pressure $W_2$ is one-half the discharge pressure $P_2$ multiplied by the area of the side surface of the gear (let this area be $a'$). That is, $W_2 = a' \times P_2/2$. In order to achieve a complete balance of the pressures on the bearing members, it is necessary to establish a relationship $a \times P = a' \times P_2/2$ or $W_1 = W_2$. This requirement can be met by locating the seals properly taking area considerations into account. In this way, the spaces between the bearing members and the side surfaces of the gears and the gaps between the side surfaces of the bearing members and the covers can be kept at predetermined values. Said gaps are always filled with proper amounts of the oil, and if necessary certain amounts of the oil are removed from said gaps to maintain the balance of the pressures. Since the bearing members themselves are movably mounted, said gaps can be kept at predetermined values at all times. In FIG. 7, the flows of the oil used for lubrication are indicated by the arrows without symbols. This oil starts at the gears, and flows into the gaps between the shafts 6 and 6' and the bearing members 7 and 7', reaching the oil holes 14 and 14a. The oil entering the oil hole 14 in the left side cover (FIG. 7) flows through the oil discharge passage 16, the communicating passage 15, and the recovery hole 17, and is recovered at the suction port 8. The oil entering the oil hole 14a in the right side cover shown in FIG. 7 flows through the oil discharge pipe 16a to the oil hole 14 in the right side cover, and then flows from the oil hole 14 through the through oil passage 13 for recovering the lubricating oil provided in the shaft 6' to the oil hole 14 in the left side cover. It will be understood that the lubricating oil recovering circuit consists of a lubrication path adapted to forcedly produce a flow flowing to the suction port.

Figure 9:
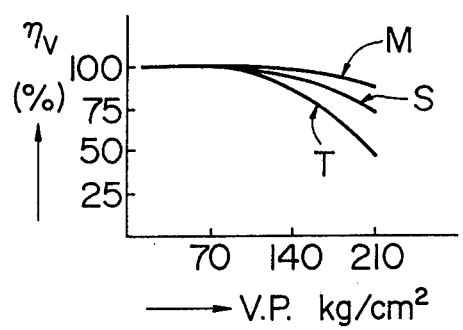
FIG. 9 is a characteristic comparison diagram illustrating the relationship between the pump volumetric efficiency and the discharge pressure for the pump in accordance with the present invention and a conventional pump.
Figure 10:
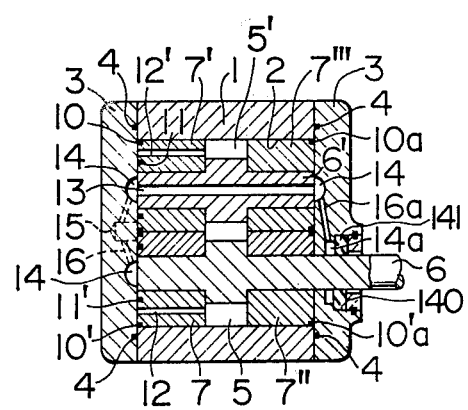
FIG. 10 is a sectional side view showing a portion of a gear pump which is another embodiment of the present invention and in which the pressure balancing means are arranged only in the bearings on the left side of the gears.
Figure 11:
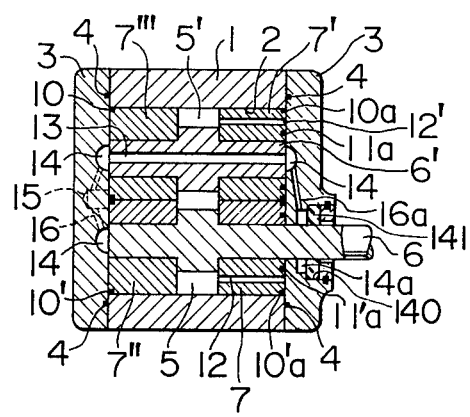
FIG. 11 is a sectional side view illustrating a portion of a gear pump which is a further embodiment of the present invention and in which the pressure balancing structures are arranged only in the bearings on the right side of the gears.

FIG. 9 is a diagram illustrating the relationship between the volumetric efficiency of the pump $\theta v$ (%) and the discharge pressure V.P. (kg/cm$^2$). The curves M, S and T respectively show the characteristics of the gear pump in accordance with the present invention, the characteristics of a conventional gear pump having a conventional pressure balancing means, and the characteristics of a conventional gear pump without a pressure balancing means. From these experimental results it is clear that the gear pump in accordance with the present invention enjoys a higher discharge pressure and a more improved pump volumetric efficiency than the conventional gear pumps. The through oil passages 12 and 12' in accordance with the present invention may be located at any desired position between the suction port 8i and the discharge port 9v in any desired manner. However, a large number of the experimental results indicate that the best effect is obtained if the through oil passages 12 and 12' are located nearly in the middle between the suction port 8i and the discharge port 9v, i.e., at the position ½ L, in order to receive the oil under a pressure of approximately $P_1$ (FIG. 8). Observations have shown that the bearing temperature is stabilized and the wear of the bearing thrust surfaces is kept in a satisfactory range in cases where the through oil passages 12 and 12' are positioned nearly in the middle between the suction port and the discharge port. The experiments also have shown that a slight displacement of the positions of the seals 11, 11', 11a and 11'a towards the suction port side with respect to the gear shafts (see FIG. 2), results in an automatic adjustment of the inclinations caused by the pressure difference between the suction side and the discharge side, which leads to a very favorable operational effect. It will be understood that the above explanations apply only to a preferred embodiment of the present invention, and needless to say should not be interpreted in a limited sense. Although the present invention preferably includes, as in the embodiment described above, the pressure balancing means arranged at the bearing members on both sides of the gears, in view of a simplified manufacture of the gear pump, the pressure balancing means may alternatively be arranged only at the bearing members on the left or right side of the gears. Fairly excellent results can be obtained by these methods. FIGS. 10 and 11 illustrate further embodiments of the present invention formed from the above viewpoint. The gear pump of FIG. 10 has through passages 12 and 12' provided only in bearing members 7 and 7' on the left side of the gears. Chambers are formed between a pair of seals 10 and 11 and between a pair of seals 10' and 11'. Bearing members 7'' and 7''' on the right side of the gears have only outer seals 10a and 10a' for preventing the flow of the high-pressure oil to the low-pressure side, and are provided with no through passage and inner seal. In the gear pump of FIG. 11, through passages 12 and 12' are arranged only in bearing members 7 and 7' on the right side of the gears. Chambers are formed between a pair of seals 10a and 11a and between a pair of seals 10'a and 11'a. Bearing members 7'' and 7''' on the left side of the gears have only outer seals 10a and 10a' for preventing the flow of the high-pressure oil to the low-pressure side, and are provided with no through passage and inner seal. The embodiments shown in FIGS. 10 and 11 are made simpler in construction than the embodiment of FIG. 1 in order to reduce the manufacturing cost. These simplified embodiments are capable of attaining fairly superior effects in view of their handy constructions. The explanations on the portions of the gear pumps of FIGS. 10 and 11 other than the chamber means and the bearing members are omitted because said portions are the same in construction as that of the gear pump of the first described embodiment.

Instead of the casing shown in FIGS. 1, 10 and 11 which is provided with the covers on both sides thereof, there may be used a casing having a cover 3 on the left side thereof alone illustrated in the FIG. 12 or a casing having a cover 3 on the right side thereof along illustrated in FIG. 13. FIG. 14 shows how the oil is introduced through the through passage 12' into the chamber O between the pair of the seals 10 and 11 at the bearing member 7' of FIG. 5, with the result that the bearing member 7' is displaced slightly to the right. The formation of the chamber O will be understood well from the figure.

As has been described in the foregoing, in accordance with the present invention, the pressure produced within a gear pump is introduced through a bearing to the rear surface of the bearing member, so that a balance of the pressures can be established uniformly on the whole thrust surfaces of the bearings. Further in accordance with the present invention, the high pressure zone and the low-pressure zone can be separated from each other completely, and a low-noise, high-pressure, high-performance gear pump can be obtained. The gear pump in accordance with the present invention not only can improve the pump volumetric efficiency, but also can introduce a large amount of the lubricating liquid to various point of the bearings to achive a decreased bearing temperature and an improved durability of the bearings, and therefore is very useful for the industries.

What we claim is:

1. A gear pump comprising a pair of intermeshing gears, a driving shaft operatively connected to one of said gears and driven shaft operatively connected to the other of said gears and a seal arrangement for maintaining axial pressure fields of said gear pump, said seal arrangement including bearing bushes disposed at least on one side of said gears with said bearing bushes extending around one of said shafts in bearing relationship therewith, each of said bearing bushes having on one end a first annular groove surrounding a bore through which a respective one of said shafts extends and a second annular groove at the periphery thereof, a first annular or ring seal seated in said first annular groove to define a first pressure field encompassing a bearing bore through which one of said shafts extend, a second annular or ring seal seated in said second annular groove to define a second pressure field, said pump including a housing with an end wall cooperating with said seals said pressure fields, said bearing bushes each including a flattened portion on its periphery extending beside a coextensive similarly flattened portion on the periphery of an adjacent one of said bearing bushes, each of said second ring seals following the contour of said flattened portions of its respective bearing bushing whereby each of said flattened portions and the second ring seal seated thereon is in abutting relationship against the flattened portion of the bearing bushing coextensive therewith to define said second pressure field, wherein said second pressure field is of relatively high pressure compared to that of said first pressure field.

2. A gear pump according to claim 1, wherein the first pressure field seal is disposed eccentrically to the gear shaft with the point of concentration of these pressure fields being displaced to the suction side of the pump.

3. A gear pump according to claim 1, wherein at least one of said bearing bushes is provided with a passage leading from a region of the pump chamber, in which the tooth gaps have an intermediate discharge pressure, to the pressure field defined between said first and second seal rings.

* * * * *